A. F. RIETZEL.
AUTOMATIC ELECTRIC WELDING MACHINE.
APPLICATION FILED OCT. 25, 1905.
985,838.
Patented Mar. 7, 1911.
5 SHEETS—SHEET 4.
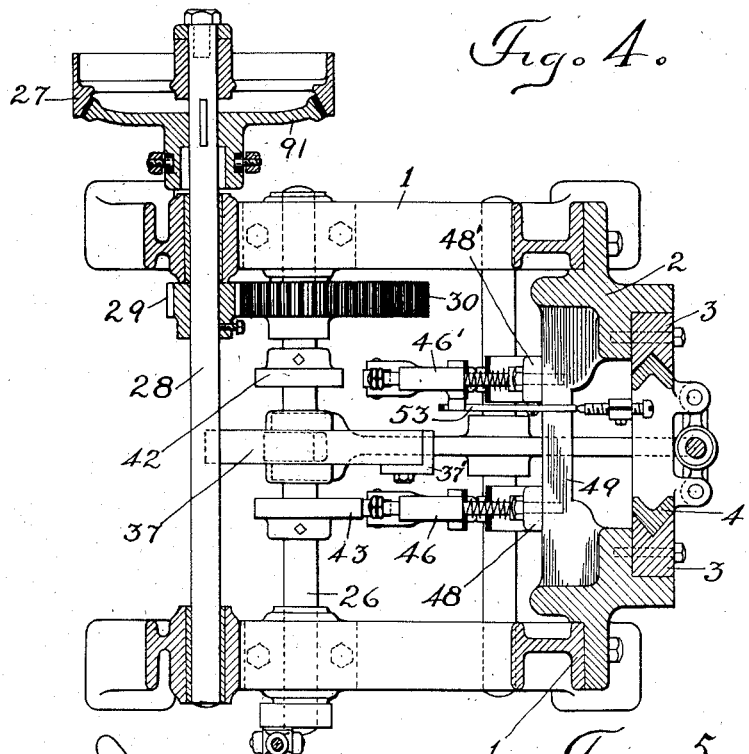
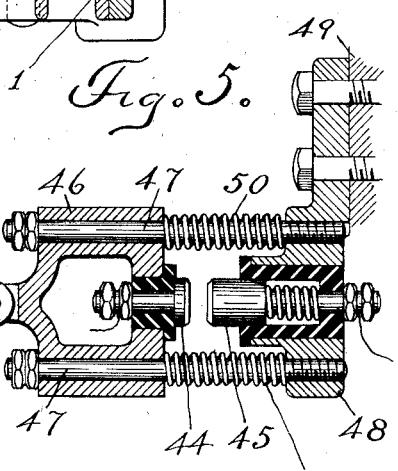
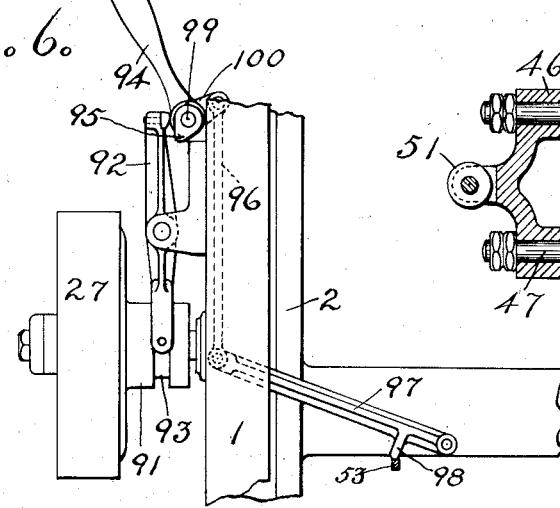
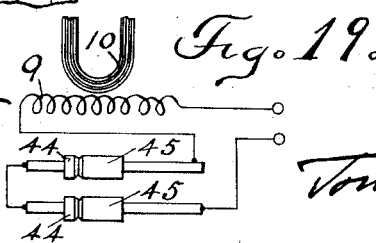
WITNESSES:
C. H. Gischner Jr.
Lillian Blond.
INVENTOR
Adolph F. Rietzel.
BY
Townsend & Decker
ATTORNEY

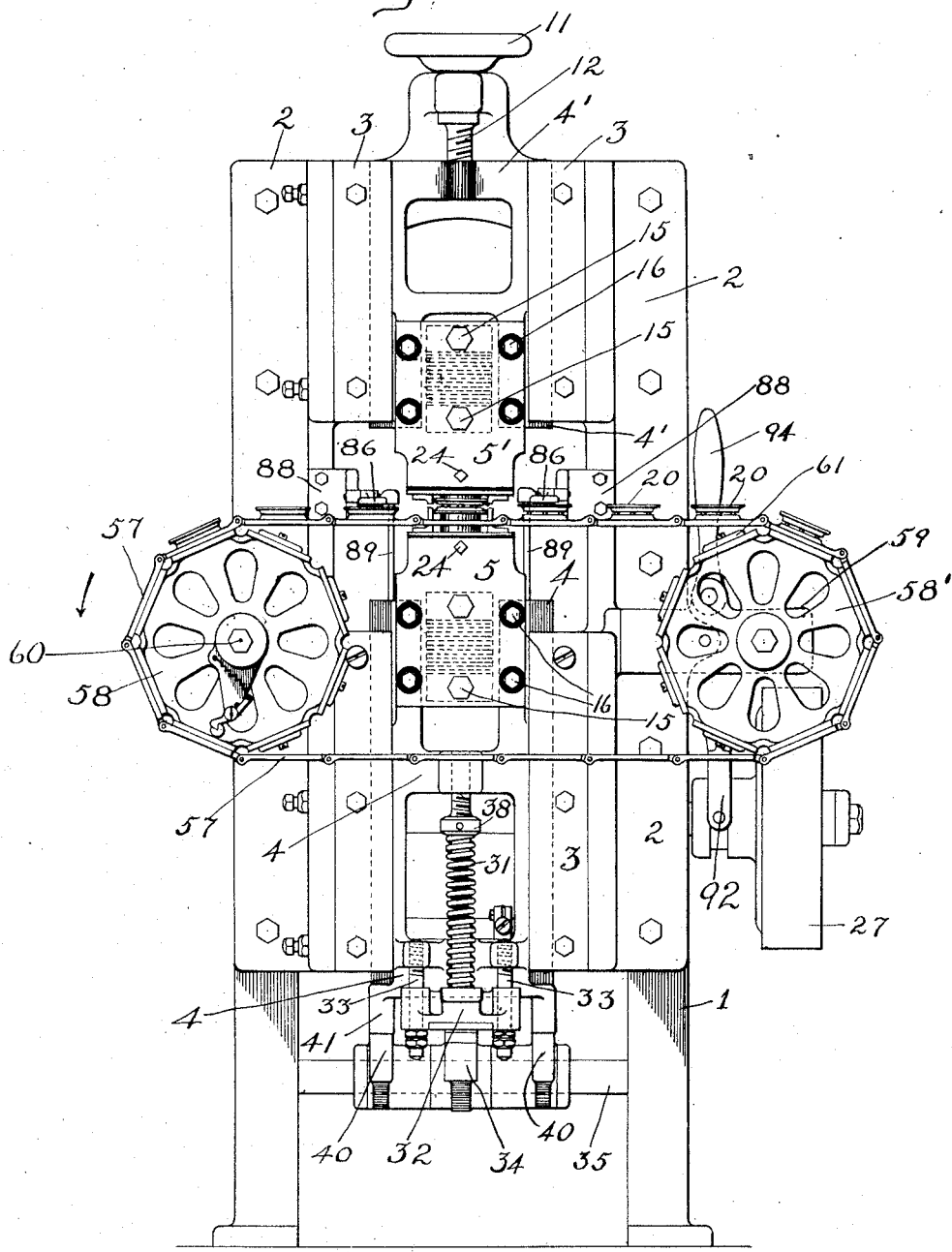

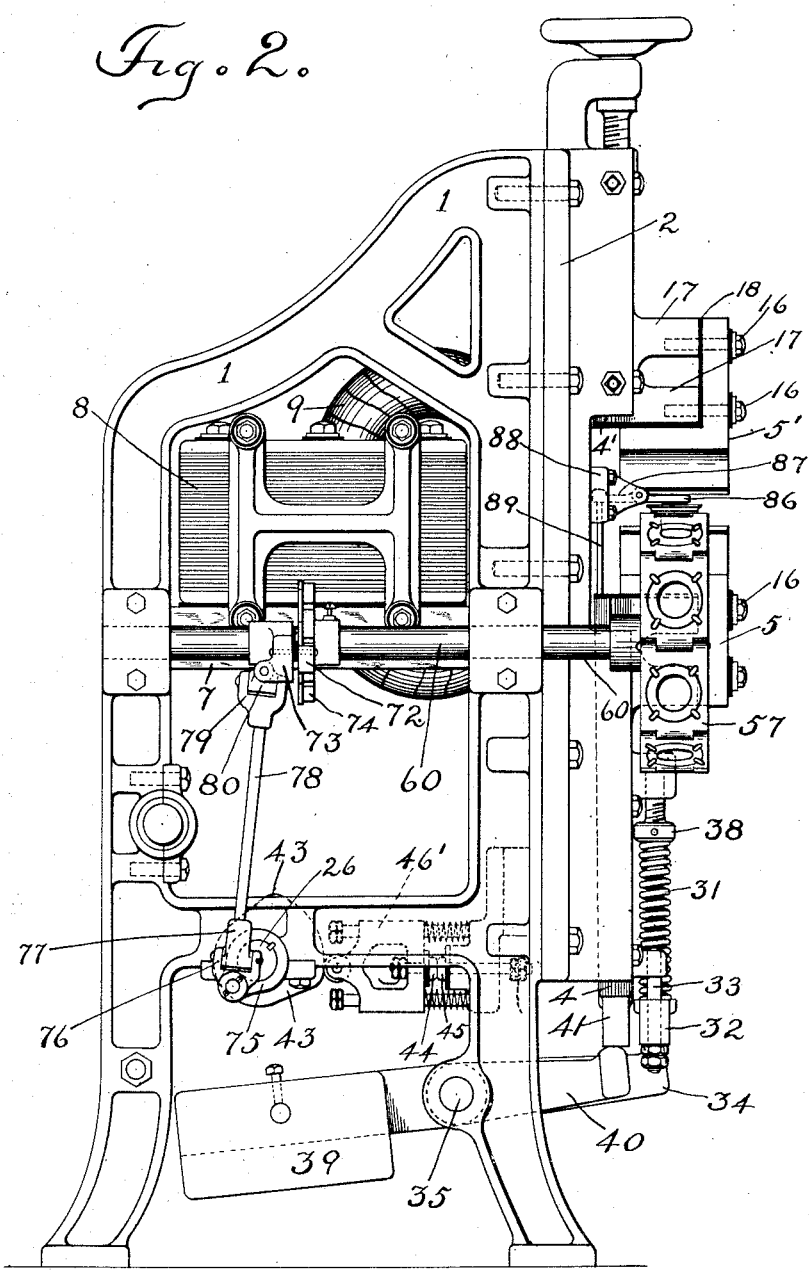

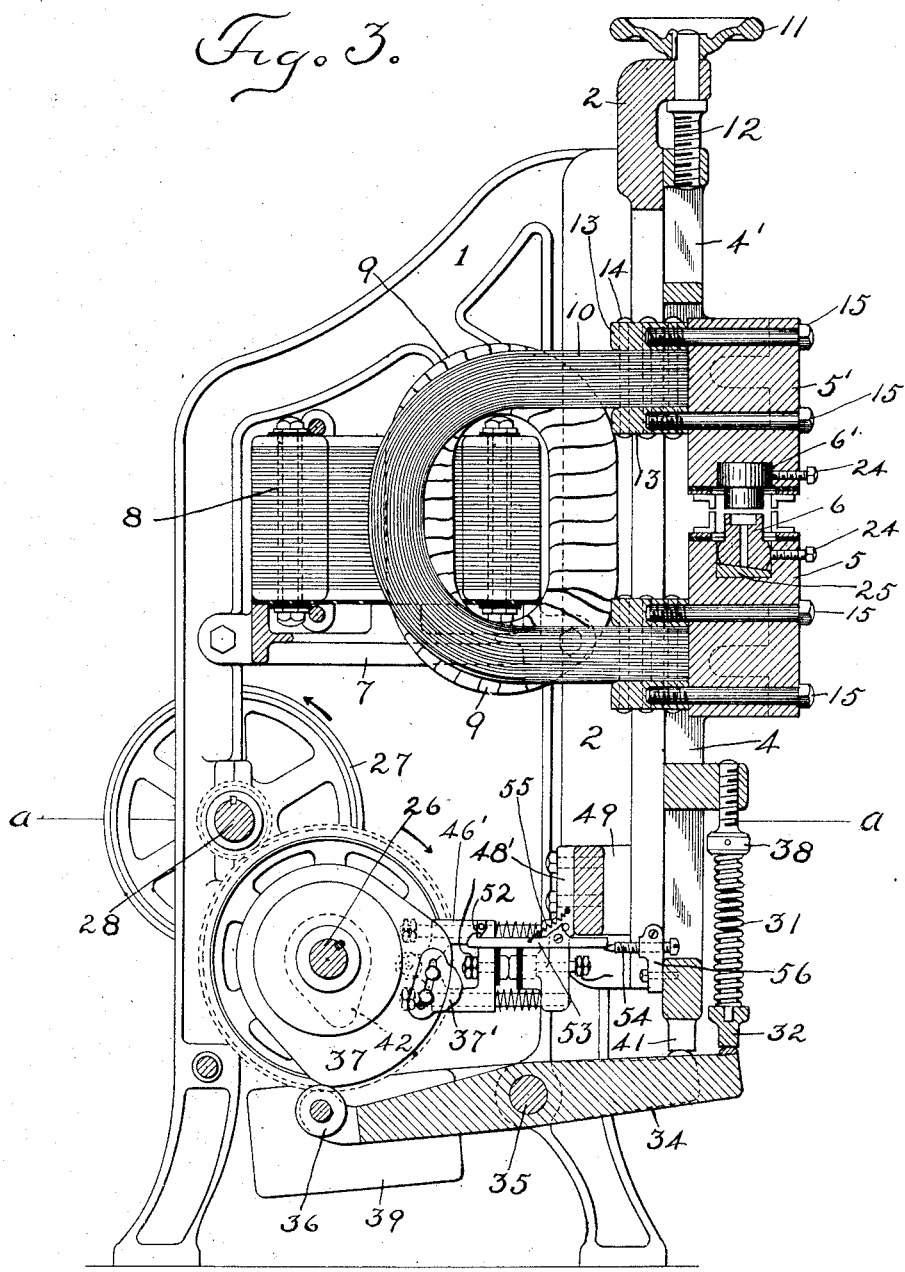

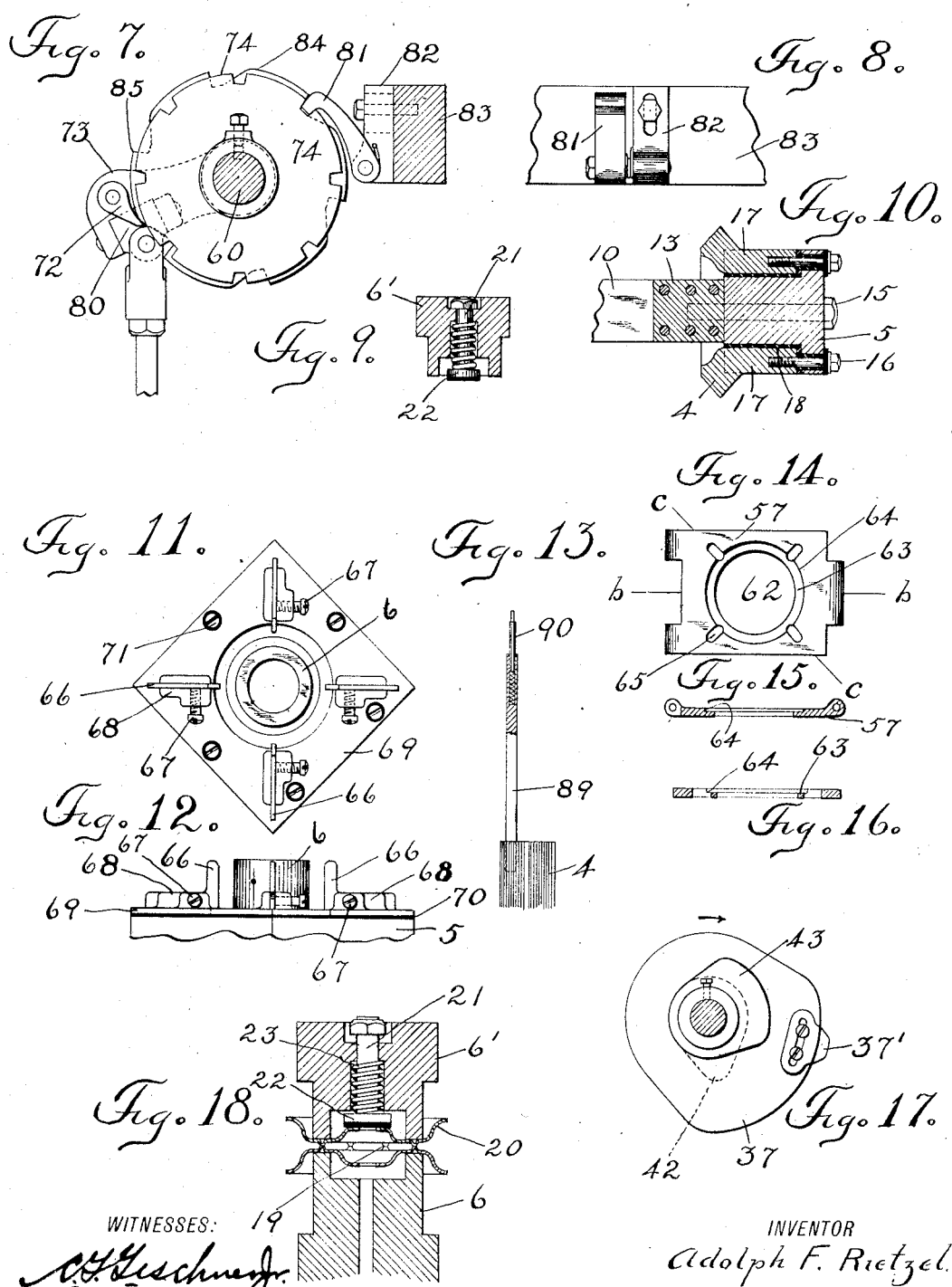

UNITED STATES PATENT OFFICE.

ADOLPH F. RIETZEL, OF LYNN, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

AUTOMATIC ELECTRIC WELDING-MACHINE.

985,838.      Specification of Letters Patent.      Patented Mar. 7, 1911.

Application filed October 25, 1905. Serial No. 284,317.

*To all whom it may concern:*

Be it known that I, ADOLPH F. RIETZEL, a citizen of the United States, and a resident of Lynn, in the county of Essex and State of Massachusetts, with post-office address Lynn, Massachusetts, have invented certain new and useful Improvements in Automatic Electric Welding-Machines, of which the following is a specification.

My invention relates to that class of electric metal working apparatus in which provision is made for heating the work by an electric current conveyed through the same by suitable electric contacts engaging it and in which also provision is made for applying pressure to the work through the action of suitable work engaging slides.

The object of my invention is, generally speaking, to provide a machine which shall be of simple and compact construction, which shall be automatic in its entire operations and require no duty on the part of the attendant beyond placing the work upon a suitable work holder or carrier by which the work is fed into position for heating and the application of pressure.

A further object of my invention is to improve many of the details of construction of electric metal working apparatus.

A further object of the invention is to provide a machine which may be readily employed in the work of welding two disks of struck up sheet metal together face to face, as for instance, in the manufacture of sheaves or pulley blocks of sheet metal composed of two disks united face to face by welding them together at a number of isolated points or spots.

While the apparatus herein described is useful for such special work, it may, by suitable modifications of the work holders or carriers, contact blocks and other devices which come into engagement with the work, be used for other purposes and for welding or otherwise working other objects.

The invention consists, among other things, and broadly stated, in the combination with a pressure slide or block by which pressure is applied to the work, of suitable locating or centering devices which are adapted to center or properly locate the work when fed into the space between the pressure devices by any suitable means.

The invention consists also in an improved combination of pressure slides or contact blocks and a link belt work carrier which feeds the pieces of work into position between said slides for the welding or other operation.

The invention consists further in the provision of a perforated or cut away work carrier adapted to afford spaces for the passage of the work locating or centering devices carried by the pressure slide and in other details of construction as will be hereinafter more particularly described and claimed.

The invention relates further to the manner of construction of the contact block and slide carrying the same and for making electrical connection with the contact block.

The invention consists further in special means for preventing the work from leaving the work carrier under the influence of the magnetism of the machine prior to the time that it reaches working position.

The invention consists also in details of construction relating to the feeding of the work supporting belt or carrier, the locking of same in working position, the construction of the electric contacts whereby they may be adjusted to the work, the means for insuring disengagement of the work from the contacts, the mechanism for applying the pressure to the work engaging slide and other features and combinations of devices which will be more particularly pointed out in the claims.

In the accompanying drawings, Figure 1 is a general front elevation of a machine embodying my invention, parts at the rear, however, being omitted from the figure. Fig. 2 is a side elevation of the machine on the side on which the feed mechanism is located. Fig. 3 is a central vertical section of the machine. Fig. 4 is a horizontal section on the line a, a, Fig. 3. Fig. 5 is a vertical section through one portion of the compound circuit controller, namely, that one which completes the circuit to start the flow of heating current. Fig. 6 shows a detail of the devices for disconnecting the clutch and operating the circuit breaker to insure cutting off of the current. Fig. 7 shows in side elevation the locking and releasing devices for the feed mechanism. Fig. 8 is an elevation of the locking dog. Fig. 9 is a section of the electric contact showing the ejector in place. Fig. 10 is a horizontal section showing the manner of attachment of the contact block to the slide and to the terminal of the secondary. Fig. 11 is a plan and Fig. 12 a side elevation of a form of automatic locating device that may be mounted or carried by the slide. Fig. 13 shows in vertical section the pin which operates the finger for holding the work on the carrier when the slide rises and the current is turned on. Fig. 14 is a plan of one of the links of the link belt carrier and Fig. 15 is a section on the line $b$, $b$, Fig. 14. Fig. 16 is a section on the line $c$, $c$, Fig. 14. Fig. 17 shows in side elevation the relative disposition of the cams on the main or master shaft. Fig. 18 is a vertical section through the contacts showing a special piece of work in place. Fig. 19 is a diagram of circuits.

1 indicates the main frame of the machine and 2 is a skeleton plate bolted to the main frame at the front and carrying the slides by means of which pressure is applied to the heated section of work. To said plate 2 are bolted guide plates 3 having vertical guides for the upper and lower slides 4', 4 of the machine. The upper slide 4' is ordinarily fixed in position during operation and a reciprocating motion is given to the lower slide 4 for the purpose of applying pressure to the heated section of work. In the preferred form of my invention, said slide engages the work and applies pressure thereto by means of a contact block of copper or other good conducting material which makes contact with the work and supplies the heating current thereto.

5 is the contact block for the lower slide and 5' the contact block for the upper slide, each of said contact blocks being provided, preferably, with a removable contact which may be replaced for wear or for different kinds of work, in which case, the shape of the contact face should be suitably varied. The heating current is supplied to the contact blocks and contacts from any suitable source but by preference from a transformer of the usual kind employed in this art, which transformer may be mounted in a frame 7 bolted to the main frame. The laminated core of said transformer is indicated at 8, its primary at 9 and its flexible secondary at 10. The contact blocks being in electrical connection with the terminals of said secondary, a heating current will be passed through any work compressed or held between the contacts 6, 6'.

11 is a hand wheel for operating screw 12 by means of which the position of the upper slide may be adjusted with relation to the work carrier and opposite slide.

In order to insulate the contact blocks of electric metal-working machines from the frame of the machine, the practice heretofore has been to interpose insulation between the guides for the contact carrying slide and said frame. This construction is objectionable because the guides, through shrinking of the insulation or through the fastening screws getting loose, are liable to get out of line and thus throw the slides out of alinement. To avoid this difficulty, I propose to rigidly fasten the guides to the frame without interposed insulation and to simply insulate the contact blocks from the slide, suitable means being provided for directly joining said contact blocks to the terminals of the source of heating current, said terminals being themselves adapted to move freely with the slide and contact block. In the present case the source of current being the flexible secondary of a transformer, the contact block would be secured directly to the terminal thereof and said terminal would accommodate itself to the movement of the slide and contact block carried thereby, while at the same time the contact block would be suitably insulated from the frame. One of the ways in which this direct attachment of the contact blocks to the secondary terminals may be effected is as follows;

13 indicates suitable plates of good conducting material between which the end terminal of the flexible secondary is clamped by means of suitable bolts 14. The plates 13 are tapped for the reception of bolts or screws 15 which pass through the contact blocks into said plates and clamp the blocks against the ends of the laminated secondary made up as usual of flexible copper sheets. Said blocks are also firmly and rigidly attached to the slides. This attachment may be made by means of the clamping screws 16 which enter forward projection 17 extending from each slide. To aid in forming attachment of the contact block to the slide, each block has an overhang or off set resting against the bottom or top of the projection 17; said off set takes up the strain coming upon the blocks through the application of pressure to the work while the bolts 16 have the function simply of holding the blocks in place. The bolts 16 as shown have suitable bushings or sleeves of insulating material where they pass through the block to insulate them from said block and are also provided with suitable insulating washers beneath the heads of the bolts. Plates of insulating material 18 are also interposed between the blocks and the slides at the points where they bear upon one another and as shown more clearly in Figs. 2 and 10. The projections 17 extending from the slide are arranged as shown to receive between them the portion of the contact block which bears against the end of the flexible secondary. This construction of the parts is adapted to secure firm attachment of the block to the slide and a good connection between the block and the secondary together with complete insulation of the block from the slide. It is obvious that the construction may be indefinitely varied without departing from my invention, the gist of which consists in insulating the contact block from the slide in contradistinction to insulating the guides for the slide.

The contacts 6, 6' may be constructed as more clearly shown in Fig. 18. Each block is recessed at its end to form the space which receives the central projecting portion of the two pieces of sheet metal to be welded together and around said recess is an annular pressure face adapted to engage the two halves of the work opposite the annular series of projections 19 formed on each piece of sheet metal. The projections impinge upon one another and form the path for the heating current. When the welding heat is reached, these parts soften and the two sheet metal disks come together and are welded at a number of isolated points coinciding in position with the projections 19. The two sheet metal disks 20 are struck up from sheet metal and when united in the manner indicated form a sheave or pulley. In one of said contacts, as for instance, in the upper one 6', a suitable ejector is mounted to insure detachment of the work from the contact when the weld is finished. This ejector may consist of a rod 21 working in a central bore in the contact and having a head 22 adapted to engage the work. A spring 23 tends to force the head downward and at the same time permits the head to recede when the work is clamped between the contacts. When the pressure upon the lower contact is relieved, the spring comes into action to forcibly detach the work from the upper contact. In order to avoid the tendency of arcing between the ejector and the work due to the fact that said ejector makes lighter contact with the work than the solid portion of the contact 6', I furnish the face of the ejector, where it engages the work, with suitable insulating material as indicated. Obviously such ejector device may be applied to one or both contacts. The contacts are fastened in place in sockets in the contact blocks by means of screws 24.

For the purpose of permitting the inclination of the plane of the contact face upon the contact to be changed with relation to its axial line of movement in engaging the work, I make the contact rotatable upon an inclined seat, the base of the contact being similarly inclined where it engages the seat as shown. This inclined seat is formed preferably upon a separate piece of metal 25 dropped into the bottom of the socket in the contact block which receives the contact. By rotating the contact upon this seat, it is obvious that the plane of its contact face will be inclined more or less from the normal according to the extent of rotation. The screw 24 will set the contact in its new adjusted position. By this device the contact face of the block may be made to bear firmly at all points upon the work when the portions of the same engaged by the contact depart from the normal plane which is perpendicular to the line of movement of the slides. Other conditions may arise in practice under which it will be desirable to adjust the contact plane of the contact as described.

I do not limit myself to the particular form of the contact face which engages the work, as it is obvious that the same would be varied according to the form or nature of the pieces of metal being heated and compressed between the contacts.

The reciprocating pressure slide 4 is actuated by a cam or cams or other suitable mechanism mounted upon a continuously rotating main or master shaft 26, mounted preferably in the frame 1 and driven in any suitable manner, as for instance, from a drive pulley 27 on a shaft 28 which is geared to shaft 26 through the pinion and gear wheel 29, 30. Preferably the actuating cam or cams or other devices apply a lift or pressure to the slide 4 through the intervention of a spring or springs whose power is modified by the operation of the cam or other device carried by shaft 26. Ordinarily I prefer to employ a spring which is put under compression through direct or indirect engagement of the cam with a head which sustains one end of the spring, while the other end is applied to the slide in a manner to tend to lift the same. Such a spring is indicated at 31; the lower end of said spring is sustained by a cross head 32 working and guided on guide pins or rods 33 fastened in and depending from a cross bar of the slide as clearly shown in Fig. 1. The lifting action of the cam or cams on the shaft 26 upon the cross head 32 is preferably applied through the intervention of a lever 34 hung on the cross rod 35 of the main frame. The outer end of said lever sustains the cross head, while the inner end carrying frictional roller 36 is periodically depressed for the purpose of lifting the cross head, by means of a cam 37 and a supplemental cam 37'. The cam 37 and lever 34 are clearly shown in Fig. 3, the cam however being omitted from Fig. 2 for clearness. The action of the spring may be adjusted by means of a screw 38 which receives the upward thrust of the spring and is tapped into a cross bar of the slide as clearly shown in Fig. 1.

The cam 37 applies the initial pressure to slide 4 by means of which the initial contact is established in the work for the purpose of permitting the heating current to pass.

When the work has become fully heated and softened, it yields, permitting the slide to rise under the action of the spring and at such time an increased pressure is applied to the work for the purpose of completing the weld, said increased pressure being effected by the action of the supplemental cam 37', which puts the spring 31 under further compression. This additional or further compression must be properly timed with relation to the extent of heat in the work, that is to say, it should be applied as soon as the proper welding temperature has been reached. In order to time its action properly, said supplemental cam 37', if mounted upon the cam 37 as shown, may be made circumferentially adjustable thereon by means of fastening bolts which pass through an elongated opening in the plate extending inwardly from the cam and adapted to be bolted against the face of the cam 37. Any other means for circumferentially adjusting said supplemental cam may be employed. As shown, the cam 37' forms a shoulder of the main cam 37, but obviously the manner of mounting said cam 37' may be varied, its only purpose being to act upon the lever 34 and to apply an increased pressure to the work at the proper instant for completing the weld. The slide and the parts sustained thereby being of considerable weight, it will be necessary, in the absence of other provisions, to employ a very stiff and strong spring 31 which would interfere with the delicacy of the action of the parts. To avoid this difficulty, I combine with the pressure slide 4 a suitable counterbalancing device adapted to take up a major portion of the weight of said slide so as to transfer the weight from the spring 31 which may then be made comparatively light, although of sufficient strength to permit the desired amount of pressure to be communicated to the work through compression of the spring. Preferably, the counterbalance consists of weights 39 sustained on levers 40 which engage at their outer or forward ends, the downwardly extending projections 41 from the slide 4. Said levers may be mounted upon the shaft 35 as indicated. Normally the weight of the slide and its parts is sustained by the weights 39 and by the spring 31. When the cross head 32 is raised, the spring 31 is put under additional compression and the slide rises, the weights 39 at the same time through the levers 40 following up and continuing to sustain the major portion of the weight of the slide and attached parts. This motion of the slide continues until stopped by the full engagement of the two pieces to be welded and then, through devices to be presently described, the current is turned on and the pieces heated. When the work has become plastic or reached the welding temperature, it is necessary to the best operation to instantly apply a much heavier pressure which shall complete the weld. This is done by the action of the cam 37' which comes into play at that instant to still further lift the cross head 32 and further compress the spring 31, which then exerts an increased lifting effect.

The heating current is turned on and off by means of a compound circuit controller comprising two members or elements, both of which must be in circuit closing position to establish the flow of current in the primary circuit of the machine, which circuit, as usual in the art, contains the starting and stopping circuit controller of the apparatus. The one member of said circuit controller for brevity may be called the break switch, since, when it assumes open circuit position, the flow of current is stopped, although the other member may be in closed circuit position. The latter member may be termed the closing switch, since it is the last one of the two members to close circuit and thereby establish a complete circuit which is carried through said switches in series and as indicated in the diagram, Fig. 19.

42 is a cam on the master shaft 26 for setting the break switch to closed circuit position and 43 is a cam on the same shaft for operating the closing switch to complete the circuit. Said switches are preferably constructed as shown more in detail in Fig. 5 which represents in section the parts of the closing switch. The break switch is of substantially the same construction being only provided in addition with a latch by which it may be temporarily retained in circuit closing position, although relieved from the action of the setting cam 42. Each switch comprises a pair of contacts 44 and 45, which constitute heads upon rods furnished at their rear ends with suitable means of attachment of the circuit wires. Contact 44 is mounted in a cross head 46 which slides on guide rods 47. These rods project from a bracket 48 suitably fastened to the cross bar 49 of the front frame or plate 2. Between the bracket and the head, springs 50 are mounted on said rods for the purpose of returning the head to open circuit position. The cross head 46 is furnished with a friction roller 51 which is engaged by its cam. The rod carrying contact head or rod 44 is mounted in a suitable insulating bushing in the cross head 46. The rod which carries contact 45 is similarly mounted in the bracket 48, but in addition is furnished, as shown, with a spring which yields when the head 46 is forced toward contact 45, thus permitting free movement of the cam and head 46 in the operation of closing the circuit. The cross head 46' for the break switch is furnished, as shown in Fig. 3, with a catch 52 adapted to be engaged by a latch 53 pivoted on the bracket 48' of the break switch. Said latch retains the head 46' of the break switch in position to keep the contacts closed until the latch is actuated by a trip 54 which, by engaging the outer end of the lever 53 depresses the latch against the action of spring 55 and frees the break switch so that by the action of the springs acting on its cross head 46', said switch will be caused to break circuit and stop the flow of the heating current.

The trip 54 preferably consists of an adjustable pin mounted in an arm 56 which is secured to a cross bar of the lower slide 4. When the slide is permitted to rise through the softening of the heated section of work, the trip 54 unlatches the circuit breaker. Fig. 3 illustrates the position of the parts put under preliminary compression and the slide thereby raised to establish the contact in the work, but before the further compression takes place, which is produced by the action of the cam 37', after the work has reached welding temperature.

The relative position of the shaft 26 and the cams thereon with relation to one another at such stage of the operation which is the same as the stage represented in Fig. 3, is shown as to all the cams in Fig. 17. The work is fed into position between the contact carrying slides by means of an endless work supporting carrier which, by preference, consists of a belt 57 traveling on belt wheels or pulleys 58 and 58'. The belt travels transversely through the space between the contacts or contact blocks and said belt occupies a vertical plane parallel to the front plate of the machine as shown. The wheel 58' is mounted on a stud projecting from a bracket 59 attached to the frame of the machine. The wheel 58 is carried by a shaft 60 intermittently rotated as will be presently described to bring the pieces of work successively into position for heating and pressure between the contact blocks or slides. Said shaft 60 is mounted in suitable bearings as shown in Fig. 2 on one side of the machine. Said shaft extends rearwardly in a direction approximately at right angles to the main or master shaft 26.

The work carrier 57 is preferably constructed as a link belt, each link of which is adapted to support a piece of the work and is of proper form at its under side to receive disks 61 fastened to the face of the pulley or pulley wheels 58, 58'. For this purpose it is conveniently provided with a circular opening 62 as better illustrated in Fig. 14 into which opening circular projections 61 enter to engage the belt and carry the same along. Said opening likewise affords a passage for the lower contact 6 when the same is raised by the action of the lower slide 5 and coöperating devices. A ledge 63 around said opening affords a rest for the disk 20. Said disk is held on the link against displacement partially by the annular shoulder 64 around said ledge. At the points 65, openings are provided in the link for the passage of locating devices mounted on the slide or contact block and lifted with said slide after the work has been fed into position between the contacts. These locating devices are of any suitable character adapted to center or locate the work properly with regard to the contacts or other devices which engage and apply pressure to the work. These locating devices act independently of the position of the links of the belt and operate to correct any inequalities or inaccuracies in the feed of the work holding carrier or belt. Various forms of locating devices may be used, but preferably, they are composed of one or more pins which are adapted to engage the sides of the disk or other piece of work or to enter a centering or locating opening or depression in the same. These locating devices are properly mounted in a manner to be insulated from the contact or the contact carrying block.

Referring to the detail views, Figs. 11 and 12, locating pins adapted to engage the sides of the disk 20 are shown at 66. Each may consist of an angle plate, one arm of which projects upwardly to form the locating pin, while the other arm is clamped by suitable screw 67 in a slot in a projection 68 extending upwardly from a plate 69 which is fastened to the top of the contact block 5. The angle plates are adjustable in the slots on radial lines for any varying diameter of the disk or piece of metal being welded and requiring to be centered, and the upper ends of the parts which constitute the locating pins are beveled or rounded at their inner side to enable them to readily pass the edge of the disk. The plate 69 is insulated from the top of the contact block by a plate of insulation 70 and the fastening screws 71 by which it is fastened down have proper insulating bushings and washers.

The carrier with the pieces of work supported upon it as shown in Fig. 1 is intermittently fed forward the space of one link or work holder to bring a new piece of work into position and to carry away the welded piece of work out of position between the contacts, by any suitable feed mechanism operating on the shaft of one of the belt wheels. During said feed movement, the slide is depressed so that the lower contact and the centering devices are out of the way of the belt. The feed movement is imparted to shaft 60 from the main or master shaft 26 by the operation of a pawl 72 secured to an arm 73 loosely mounted on the shaft 60 and adapted to engage the teeth of a ratchet wheel 74 fixed on said shaft. On said shaft 26 is a crank 75, the crank pin of which carries a yoke 76. In said yoke and turning on a pin connecting the arms of the yoke and in a plane transverse to the plane of rotation of the crank arm is a head 77 of a connecting rod 78. The opposite end of said connecting rod 78 terminates in a head 79 in the form of a yoke which turns on a pin passing through a block 80 that in turn swings on a pin attached to the pawl arm 73. The block 80 is adapted to swing in a plane of rotation of the crank 75 and the head 79 in a plane at right angles thereto. This connection of the crank and the pawl arm affords a universal joint connection. At each rotation of the shaft 26, the crank 75 feeds the ratchet wheel and shaft 60 forward one step.

To lock the feed devices and the work carrier at the termination of each feed movement, I provide an automatic locking dog 81 adapted to engage the notches in the periphery of the wheel 74 secured to shaft 60 at the termination of each feed movement and to hold the parts immovable against forward or backward movement. This lock 81 is shown in Fig. 7 as fully engaged. It may be spring actuated and it is preferably so mounted as to permit it to be adjusted around the periphery of the locking wheel or disk so that it shall be in position to engage the notch of the lock wheel at the termination of the feed movement under the action of the pawl 72. For this purpose said lock is mounted as shown in Figs. 7 and 8 upon an adjustable block 82, adjustable upon a bar 83 of the frame.

For the purpose of disengaging the lock from the locking disk, a cam disk 84 is provided. This cam disk is loosely mounted preferably on the shaft 16 and is provided with cams as shown adapted to lift the lock 81 out of the notches in the locking disk when the cam disk is rotated independently of said locking disk. The cam disk is moved intermittently forward step by step for each feed movement by any suitable means as for instance by the feed pawl 72 itself, which pawl is wide enough to engage the periphery of both disks 74 and 84. In Fig. 7 the pawl is shown as moved back part of the way necessary to enable it to take hold of a fresh tooth in said disks. When the pawl starts again on its forward movement, it first engages a tooth or shoulder of the cam disk 84, which tooth or shoulder as at 85, Fig. 7 extends beyond the edge of the ratchet and lock disk 74, said disk 84 being of slightly larger diameter. As the pawl moves down, it slides over the uncut edge of the locking disk and hence may move freely, although the lock 81 may still lock said disk. But in moving forward the pawl turns the disk 84 and the cam projection or rise between the ratchet teeth on the disk 84 lifts the dog 81 out of the notch in disk 74 so that by the time the pawl 72 falls into a notch in said disk 74 and is ready to turn the same, said disk will be unlocked and may make a full step forward to bring the lock 81 into registry with the next locking notch in the disk which occurs at the termination of the feed movement.

At 86 is shown a retaining arm or finger, which is adapted to hold the work down upon the carrier and prevent the same from being drawn off said carrier by the action of the magnetic field of the transformer. This finger or arm is arranged to act upon the portion of work next that which is being heated and said finger is preferably duplicated on both sides of the machine as shown, so as to detain not only the piece of work which is awaiting the discharge of the piece between the contacts, but also that which has just been welded but which is still in the magnetic field of the transformer and would, unless detained be drawn from the carrier by the magnetic attraction. Each finger 86 may be mounted on an arm 87 pivoted on a bracket 88 secured to the plate or frame 2 and having its rear end in position to be engaged by the upwardly projecting pin or rod 89 which is secured to the lower slide 5. Preferably the upper end of said pin terminates in a spring seated pin 90 seated on the spring in the upper end of the rod as shown in detail in Fig. 13 so as to engage the under side of the lever 87 by a yielding action. The forward end of said lever carrying the finger projects as shown over the belt, but said finger, when the slide is depressed, is raised by the superior weight of the inner end of the lever 87 so as to be out of the way of the belt or the pieces of work carried thereby. When the slide rises to clamp the work and before or at the instant that the flow of current begins in the transformer, the fingers are depressed by the action of the rods 89 so as to press the pieces of work beneath them down upon the carrier and prevent their displacement. The spring action afforded by the seating of the terminal 90 upon the spring permits the slide to make its full movement without depressing the belt or carrier through its action upon the finger. To prevent possibility of escape of current through the finger and work engaged thereby, its face, which impinges on the work, is provided with insulation as shown.

The power pulley 27 is connected up to the machine through a suitable clutch consisting of a friction cone clutch 91 or other form of clutch which has a spline connection with the shaft 28 so as to be capable of sliding thereon and of imparting rotary motion thereto. Pulley 27 is loosely mounted on said shaft. The clutch is operated to stop the machine by means of a lever 92 whose yoke shaped lower end works in a slot 93 in the hub of the clutch, while its upper end may be operated by the handle 94 mounted on a rock shaft 99 which carries a cam 95 adapted to engage the lever 92 and in so doing to disconnect the power. The rock shaft 99 is extended forward to a point opposite the break switch and is there provided with an arm 100 which is joined to a link 96 connected to a lever 97 pivoted on the cross bar of the frame and adapted by the nose 98 to impinge upon the latch 53 so as to depress the same and free the circuit breaker. By this means, I insure the cutting off of current when the machine is thrown out of use by disconnection of the power.

The general operation of the machine is as follows: The pieces of work are laid upon the belt carrier as indicated by the attendant. In the drawings the machine is shown with the parts at that stage of the operation at which the lower slide has been lifted by the action of the cam 37 and the current has been turned on by the action of the cam 43 to cause heating of the work. As the shaft 26 rotates, the cam 37 maintains the preliminary contact and the current as it passes heats and softens the work until finally the same assumes plastic condition and is ready for welding. At this instant, the cam 37' engages the lever 34 and raises the slide still farther to apply the stronger or welding pressure as already set forth. At the instant the slide begins to rise to effect this weld, the trip 54 unlatches the circuit breaker and the current is turned off. Immediately thereafter the cam 37 frees the slide, and the contact 5 together with the centering or locating devices carried by the slide recede through the link of the belt carrier and the welded pieces drop down upon the carrier so that they may be fed out of the space between the contacts. The detachment of the work from the upper contact is facilitated by the operation of the ejector. The contact and the centering devices being now out of the way of the belt or carrier, the latter can be fed forward one step. During the operation described, the parts have been held in locked position by the locking dog 81 engaging locking disk 74 on the feed shaft 60. As the master shaft 26 turns, it carries the feed pawl back to position for the next feed movement and immediately after the carrier has been freed as described, the pawl takes hold of the next tooth or shoulder of the cam disk 84 and by moving the same forward withdraws the dog 81 from the locking disk, immediately after which, said pawl takes hold of the tooth of the disk 74 and turns the shaft 60 so as to move the feed belt forward one step. At the completion of this forward movement, a new piece of work will be in position between the contacts and the dog 81 will lock the feed shaft and carrier in that position. The same movement will feed the finished work from between the contacts. Before the forward end of the cam 37 reaches the lever 34, the cam 42 on the master shaft will engage the cross head 46' of the break switch and set the same back to closed position where it will be held by the latch 53 which has been freed from the trip 54 through the depression of the slide which takes place as soon as the rear end of the cam leaves the lever after the completion of the weld. Immediately after the completion of the feed movement, the forward end of cam 37 reaches the position shown in Fig. 3 and in so doing lifts the slide and causes the contact and the centering devices to pass through the work carrier and engage the work so as to apply the preliminary pressure. The work thereupon begins to heat the circuit having been completed through the action of the closing switch cam 43 which acts on the head of the closing switch at the time that the cam 37 operates to bring the lower contact into engagement with the work. Before the closure of the circuit by the closing switch cam, the retaining fingers 86 are operated by the slide to engage the idle pieces of work and prevent them from being detached from the carrier as already explained. This completes the cycle of action which has been described as starting with the application of the preliminary or heating pressure.

What I claim as my invention is:

1. In an electric metal working apparatus, the combination of a work-supporting carrier, a contact carrying and work compressing slide and a work locating device operated by said slide.

2. In an electric metal working apparatus, a link belt carrier having work receiving perforated links, and a reciprocating work compressing slide adapted to engage the work through the links, as and for the purpose described.

3. In an electric metal working machine, a perforated work carrier, a work compressing slide and a work locating device carried by the slide and adapted to enter the perforation or opening in the carrier.

4. In an electric metal working apparatus, the combination of a current supplying pressure contact and a work carrier consisting of a link belt, the links of which are cut away to afford passage for said contact.

5. In an electric metal working apparatus, the combination of a reciprocating contact and a link belt work carrier adapted to travel in a line transverse to the line of movement of the contact and having its links cut away at the center to afford an opening through which said contact may engage the work.

6. In an electric metal working machine, the combination of a pair of work compressing and current supplying contacts adapted to compress and supply current to the work between them, a work carrier cut away to permit a contact to reach the work supported thereon and means for feeding said carrier transversely across the space between the contacts.

7. In an electric metal working machine, the combination of a pair of work compressing contact blocks between which the work is compressed, locating devices carried thereby, a work-supporting carrier having openings through which the locating devices may pass and means for feeding said carrier transversely through the space between the contact blocks.

8. In an electric metal working apparatus, the combination of a work compressing contact block for applying pressure to the work and a work locating device secured to and insulated from said block.

9. In an electric metal working apparatus, the combination of a work engaging slide adapted to apply pressure to the work, a work holder or carrier mounted independently thereof and locating devices carried by the slide.

10. In an electric metal working apparatus, the combination of an independent work engaging and pressure contact slide and a work locating device carried by said slide.

11. In an electric metal working apparatus, the combination of a work engaging current supplying slide adapted to supply current and apply pressure to the work and independent locating devices acting on the work as the slide moves forward.

12. In an electric metal working apparatus, the combination with a movable work engaging element, of a pressure cam for applying the initial pressure during heating and a supplemental cam acting on said element for applying the increased or welding pressure after the work has become heated.

13. In an electric metal working apparatus, the combination with the work engaging slide, of a pressure spring, a cam compressing the same during heating of the work and a supplemental cam for further compressing the same to cause increased or welding pressure upon the work.

14. In an electric metal working apparatus, the combination with a movable work engaging element, of a cam acting thereon to apply pressure to the work and a shoulder on said cam for applying the increased or welding pressure after heating of the work.

15. In an electric metal working apparatus, the combination of a movable work engaging element, a shaft and means actuated thereby for applying an initial pressure to the work-engaging element during one stage of rotation of the shaft and during heating by the current followed by a supplemental welding pressure in a subsequent stage of rotation.

16. In an electric metal working apparatus, the combination with a pressure slide, of a spring bearing thereon and a shaft provided with means for initially compressing the spring during heating and for subsequently further compressing said spring to complete the weld.

17. In an electric metal working apparatus, the combination of a slide through which pressure is applied to the work, a spring acting on said slide, and a rotating shaft carrying means for modifying the strength of the spring to apply initial pressure and for subsequently increasing the pressure to complete the operation as and for the purpose described.

18. In an electric metal working apparatus, the combination of a work engaging slide, and a shouldered cam acting on the slide to first apply the preliminary or initial pressure and subsequently, by the shoulder, apply an increased pressure after the work has been rendered plastic.

19. In an electric metal working apparatus, the combination with the work engaging slide, of a shouldered cam acting thereon to apply pressure to the work, the shouldered portion of said cam being circumferentially adjustable, as and for the purpose described.

20. In an electric metal working apparatus, the combination with the work carrier operating in vertical guides, of a counterbalance for the weight of the carrier and its parts, a pressure spring partially sustaining such weight, and means for compressing the spring to take up the difference between the counterbalance and the weight of the carrier and cause the latter to act on the work with a yielding pressure.

21. The combination, substantially as described, of the work carrier, a counterbalance lever applied to the same, a cross-head working on suitable guides, a spring interposed between the cross head and the carrier and a cam acting on the cross head, as and for the purpose described.

22. The combination, substantially as described, of a work engaging slide, a counterbalance lever applied to the same, a cross head working on suitable guides, a spring interposed between the cross head and the slide, a cam acting on the cross head to cause initial pressure upon the work and a supplemental pressure cam acting to positively apply increased or welding pressure after heating of the work.

23. In an electric welding apparatus, the combination of the work engaging slide working in vertical guides, a counterbalance, a spring partially sustaining the slide, a vertically guided cross head supporting the spring and a shouldered actuating cam for applying initial pressure to the work and then by its shoulder applying an increased pressure when the work in softened.

24. In an electric metal working apparatus, the combination of the work engaging slide, adapted to slide vertically, a counterbalance acting on the slide, a spring partially sustaining the weight of the slide, a cross head sustaining the spring, a lever engaging the cross head and a cam acting on said lever and having a shoulder for applying increased pressure after the work has heated.

25. In an electric metal working apparatus, the combination of a work carrier, a finger adapted to engage the work and hold the same on the carrier against displacement by the magnetic field of the machine, and means for automatically actuating said finger, as and for the purpose described.

26. In an electric metal working apparatus, the combination of the work supporting carrier, a finger adapted to engage the work thereon, a work engaging slide, means connected with said slide for actuating said finger and a spring interposed between the slide and finger to permit the movement of the slide after the work has heated and softened.

27. The combination, substantially as described, of the work holding feed carrier, a pair of contact slides between which the same is fed, a finger adapted to engage the work located upon the carrier in proximity to the point where welding takes place and means connected with one of said slides for operating said finger to cause it to engage the piece of work next that which is being operated on.

28. In an electric metal working apparatus, the combination of a link belt carrier for the work, a pair of contacts, means for feeding the work transversely through the space between said contacts, an arm extending over said link belt, a contact carrying slide and means carried by the slide to actuate the arm and bring it into engagement with a piece of work on a link, as and for the purpose described.

29. In an electric metal working apparatus, the combination of means for holding the work against displacement by the magnetic field of the machine and means for bringing the same into action simultaneously with the application of heating current to the work.

30. In an electric metal working apparatus, the combination of a movable work holder adapted to feed the work to position for operation and a detaining device provided with an insulating work-engaging face and adapted to engage and hold the work against displacement by the magnetic field of the machine, as and for the purpose described.

31. In an electric metal working apparatus, the combination of a flexible secondary, a work-engaging and current-supplying contact block fastened directly thereto, a slide carrying the block, rectilinear guides therefor fastened directly to and uninsulated from the frame of the machine, and fastening devices insulated from the block for securing the block to the slide.

32. In an electric metal working apparatus, the combination of a slide, a flexible secondary, a work engaging and current supplying contact block carried by and having a ledge or offset engaging the slide, bolts or screws for fastening the block to the secondary and insulated fastening bolts or screws for fastening the block to the slide.

33. In an electric metal working machine, an electrode provided with a spring actuated ejector.

34. In an electric metal working machine, an electrode having a spring actuated ejector mounted in a socket in said electrode.

35. In an electric metal working machine, a work ejector mounted on a work engaging contact block and having a work engaging surface insulated from the block.

36. In an electric metal working machine, a work ejector having a work engaging surface of insulating material.

37. In an electric metal working apparatus, a rotatable work engaging contact combined with an inclined seat inclined to the axis of rotation of the contact whereby the plane of the contact face to the plane of the work may be adjusted.

38. The combination with the socketed contact carrier, of a contact adapted to apply pressure to the work and mounted in the socket in the carrier and an inclined seat on which the contact may be rotated around an axis inclined to the plane of the seat but coinciding substantially with the line of contact pressure.

39. In an electric metal working machine, the combination of a link belt carrier for the work, pressure contacts for the work and means for feeding said carrier transversely through the space between the contacts.

40. In an electric metal working machine, the combination of a pair of pressure contacts adapted to compress and supply current to the work and an endless work carrier adapted to feed the work transversely through the space between said contacts.

41. In an electric metal working apparatus, the combination of a pair of contacts adapted to supply current to and compress the work between them and a belt carrier for the work adapted to travel transversely through the space between said contacts.

42. In an electric metal working machine, the combination of a pair of contacts adapted to supply current to and compress the work between them, an actuating cam shaft for applying pressure, an endless work carrier adapted to travel transversely through the space between said electrodes and mechanism connected with the cam shaft for intermittently operating the carrier.

43. In an electric metal working apparatus, the combination of mechanism for applying pressure to the heated section of work, an intermittently operating work carrier and an automatic lock for locking said carrier in position where the work will be properly presented for the application of heating current and pressure.

44. In an electric metal working apparatus, the combination of a pair of current supplying pressure contacts, an endless carrier, mechanism for feeding the same intermittently through the space between the contacts, an automatic lock for locking said carrier at the termination of each feeding movement and mechanism for disengaging the lock at the beginning of each feeding movement.

45. In an electric metal working apparatus, the combination of pressure devices, an endless work carrier, mechanism for actuating the pressure devices of the machine, a step by step feed pawl connected with said actuating mechanism for feeding the work carrier, a disk or wheel on the feed mechanism, a lock adapted to engage said disk or wheel and an unlocking disk or wheel adapted to disengage the lock just prior to each forward movement of the feeding mechanism.

46. In an electric metal working apparatus, the combination of a belt carrier, a belt wheel, a driving pawl for intermittently turning said wheel, a locking disk fastened to the shaft of said wheel and an unlocking disk loosely mounted on said shaft and means for turning the latter just prior to the operation of the device which turns the shaft to feed the belt.

47. In an electric metal working apparatus, the combination of a pair of contact electrodes, a main shaft carrying devices for applying pressure through said electrodes to the work, a work supporting carrier mounted to carry the work in a direction transverse to the line of pressure and into the space between the pressure electrodes, a ratchet feed wheel, an actuating pawl for the same connected with the main shaft, a locking dog and a loosely mounted ratchet disk engaging said locking dog to unlock the same and operated by the feed pawl just before the same engages a tooth of the ratchet feed wheel.

48. In an electric metal working apparatus, the combination of an endless work carrier and the feed mechanism therefor, a lock disk or wheel, a locking dog and an adjustable support for the dog to permit the dog to be adjusted around the periphery of said wheel.

49. In an electric metal working apparatus, the combination of pressure slides, an actuating cam shaft therefor, a belt carrier for the work mounted to travel in a space between the pressure devices, a feed pawl and mechanism connected with the cam shaft for intermittently operating the feed pawl in the intervals between the operation of the pressure devices by the cam.

50. In an electric metal working apparatus, the combination of pressure devices, a pair of pressure slides mounted in vertical guides on a suitable frame, a belt carrier for the work adapted to travel horizontally between the pressure devices, a pair of belt wheels, a shaft for one of said wheels extending rearwardly in a horizontal direction and mounted on suitable bearings in the frame, a ratchet wheel secured to said shaft, a frame parallel to the line of travel of the belt, a cam shaft mounted therein, means for actuating one of the slides from said cam shaft to apply pressure to the heated section of work, and an actuating pawl driven from the cam shaft for intermittently operating said ratchet wheel in the intervals between the operations of the pressure devices.

51. In an electric metal working apparatus, the combination of a ratchet feed wheel for the feed mechanism, a locking dog, an unlocking cam and ratchet wheel mounted independently of the feed wheel, a common actuating pawl operating on said wheels to partially turn the unlocking cam and ratchet before engaging a tooth of the feed ratchet wheel mechanism for applying pressure to the work and means connected with the pressure mechanism for intermittently operating said actuating pawl.

52. In an electric metal working apparatus, the combination of a pair of current supplying pressure contacts, an endless carrier, mechanism for feeding the same intermittently through the space between the contacts, an automatic lock for locking said carrier at the termination of each feeding movement and mechanism for automatically disengaging the lock after the completion of the metal working operation.

53. In an electric metal working apparatus, the combination of a contact block, a reciprocating slide carrying the same, a constantly revolving main or master shaft, a circuit breaker, a setting device on said shaft adapted to engage and set the circuit breaker to close the circuit, and means carried by the slide for releasing said circuit breaker to open the circuit.

54. The combination in an electric metal working apparatus, of a constantly revolving main or master shaft, a pressure slide, a pressure cam on the shaft, a compound circuit controller having two members, a cam for setting one member thereof to close circuit, a latch for retaining the same in circuit closing position, a second cam on the shaft for closing the other member of the circuit controller and trip devices connected to the slide for unlatching the first named member to break the circuit.

55. The combination in an electric metal working apparatus, of a work engaging contact block, a slide carrying the same, an actuating cam shaft for operating the slide, a circuit breaker, a latch therefor, a cam on the shaft for setting said circuit breaker and a trip moving with the slide for releasing said circuit breaker.

56. The combination in an electric metal working apparatus, of a main or master shaft, a pressure slide, a contact block carried by said slide, feed mechanism for the work, a pressure cam acting on the slide and mounted on said shaft, a circuit breaker, a cam on said shaft for setting the same, means connected with the slide for releasing the circuit breaker and actuating devices for the feed mechanism connected with said shaft.

57. The combination in an electric metal working apparatus, of a clutch, a clutch operating lever, a circuit breaker, a latch for holding the same in closed position and means connected with the lever for acting on the latch to free the circuit breaker when the lever is operated to disconnect the power.

58. The combination in an electric metal working apparatus, of a clutch for connecting the same to the driving power, a circuit breaker, a latch for temporarily holding the same in circuit closing position during operation of the machine, mechanism for disconnecting the clutch and an arm carried thereby for throwing off the latch.

Signed at Lynn in the county of Essex and State of Massachusetts this twenty-third day of October A. D. 1905.

ADOLPH F. RIETZEL.

Witnesses:
P. K. PARKER,
R. C. BROAD.